(12) United States Patent
Keech

(10) Patent No.: US 9,303,664 B2
(45) Date of Patent: Apr. 5, 2016

(54) QUICK LOCK FASTENER

(71) Applicant: Nancy K. Keech, Long Beach, CA (US)

(72) Inventor: Nancy K. Keech, Long Beach, CA (US)

( * ) Notice: Subject to any disclaimer, the term of this patent is extended or adjusted under 35 U.S.C. 154(b) by 530 days.

(21) Appl. No.: 13/692,679

(22) Filed: Dec. 3, 2012

(65) Prior Publication Data

US 2013/0142589 A1   Jun. 6, 2013

Related U.S. Application Data

(60) Provisional application No. 61/567,469, filed on Dec. 6, 2011.

(51) Int. Cl.

| | | |
|---|---|---|
| *F16B 35/04* | (2006.01) | |
| *F16B 5/02* | (2006.01) | |
| *B23P 19/04* | (2006.01) | |
| *B23P 19/08* | (2006.01) | |
| *F16B 5/06* | (2006.01) | |
| *F16B 21/18* | (2006.01) | |

(52) U.S. Cl.
CPC ............... *F16B 5/02* (2013.01); *B23P 19/048* (2013.01); *B23P 19/084* (2013.01); *F16B 5/0642* (2013.01); *F16B 21/18* (2013.01); *Y10T 29/49876* (2015.01); *Y10T 29/5363* (2015.01)

(58) Field of Classification Search
CPC ............ F16B 5/02; F16B 2/18; F16B 5/0642; B23P 19/084
USPC .................. 411/347, 352, 550, 551, 554, 549
See application file for complete search history.

(56) References Cited

U.S. PATENT DOCUMENTS

| | | | | |
|---|---|---|---|---|
| 2,186,746 | A * | 1/1940 | Albin | 411/549 |
| 2,235,530 | A * | 3/1941 | Mercer | 411/347 |
| 2,487,916 | A * | 11/1949 | Zahodiakin | 411/554 |
| 2,503,305 | A * | 4/1950 | Storer | 411/549 |
| 2,817,135 | A * | 12/1957 | Harris | F16B 5/10 411/551 |
| 3,171,182 | A * | 3/1965 | Danehy | 411/552 |
| 4,040,151 | A * | 8/1977 | Brimm | 411/551 |
| 4,191,236 | A * | 3/1980 | Duran | 411/105 |
| 4,308,646 | A * | 1/1982 | Schenk | 411/554 |
| 4,790,700 | A | 12/1988 | Schwartzman | |
| 4,845,827 | A * | 7/1989 | Vandermast | B25B 27/10 29/280 |
| 4,883,382 | A * | 11/1989 | Mushya | 411/182 |
| 4,948,316 | A | 8/1990 | Duran et al. | |
| 5,388,563 | A * | 2/1995 | Hsu | F41B 5/1426 124/23.1 |
| 5,399,053 | A | 3/1995 | Duran et al. | |
| 6,174,118 | B1 * | 1/2001 | Rebers | F16B 37/041 411/107 |
| 6,678,930 | B1 | 1/2004 | Owoc | |
| 2005/0008458 | A1 | 1/2005 | Keech | |
| 2007/0196196 | A1 | 8/2007 | Schorling et al. | |

FOREIGN PATENT DOCUMENTS

SU        506274 A3    3/1976

OTHER PUBLICATIONS

PCT Search Report issued Mar. 14, 2013 for related PCT/US2012/067616 application.

* cited by examiner

*Primary Examiner* — Gary Estremsky
(74) *Attorney, Agent, or Firm* — Berliner Steffin LLP

(57) ABSTRACT

A non-friction, interlocking fastener with a bolt that is locked into a retainer incorporating an integral spring with limited compression and which is axially constrained to prevent non-linear movement.

7 Claims, 23 Drawing Sheets

QUICK LOCK FASTENER

CROSS-REFERENCE TO RELATED APPLICATIONS

This application claims the benefit of Provisional Patent Application No. 60/567,469, filed Dec. 6, 2011.

FIELD OF THE INVENTION

The invention relates to a self-locking, threadless fastener

BACKGROUND OF THE INVENTION

There is a need for a self-locking fastener that firmly fastens work pieces together and is able to withstand considerable vibration, tension and shear loads. A wide variety of high strength threadless fasteners have been available, such as shown in U.S. Patent Publication Nos. 2007/0196196 to Schorling and Keech and 2005/0008458 to Keech and Grodeman. Integral machined springs are known, such as shown by U.S. Pat. No. 4,790,700 to Schwartzman. Self-locking fasteners are known that use a retaining ring in a groove, such as shown in U.S. Pat. No. 4,948,316 to Duran, Young, and Chang. A tool using moving jaws to Compress a snap ring is shown in U.S. Pat. No. 6,678,930 to Owoc. However, none of these prior art fasteners have succeeded in the goal of providing a self-locking threadless fastener that is easy to install and which provides high strength resistance to vibration, tension and shear loads.

BRIEF SUMMARY OF THE INVENTION

The present invention is directed to a fastener that accomplishes the foregoing goal, a fastener that is improved in many respects in comparison to the threadless fasteners that have been available in the past. More specifically, the present invention provides a non-friction, interlocking fastener with a bolt that is locked into a receptacle, the fastener incorporating an integral spring with limited compression and which is axially constrained to prevent non-linear movement.

The fastener employs the axially constrained spring action to securely hold together panels or other work pieces. In one embodiment, the axial spring is positioned in the receptacle on one side of a work piece to receive the bolt, which enters the receptacle from the other side of the work piece. In another embodiment, the axial spring is positioned in a housing on the opposite side of the work piece and which contains the bolt to be inserted into the receptacle through the work piece. The use of a deformable integral spring gives the fastener considerable holding power because of the expansion of the integral spring when applied to the fastened parts. The fastener is self-locking through the expansion of a retaining ring carried on the bolt into an internal groove on the receptacle to inter-lock the fastened parts. When subjected to vibrational forces which try to pull the fastener apart, the deformable spring deflects with greater clamping force. The fastener bolt does not have threads which in prior art fasteners are subject to loosen under vibration. To improve the fastener fatigue performance, a co-axial sleeve limits the spring compression travel.

The fastener is axially installed and removed with a special tool used to insert the fastener bolt into the fastener retainer. It consists of four two-position control levers: (a) a retractable plunger that extends and retracts to align the tool on the head of the bolt; (b) a clamp end angle controller for rotating a clamp end from vertically directed to horizontally directed to sequentially enable the clamp to be inserted through the bolt and receptacle, then engage the receptacle to enable compression of the integral spring; (c) a retaining ring lever to compress and uncompress the retaining ring; and (d) a clamp lever to extend and retract the clamp.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
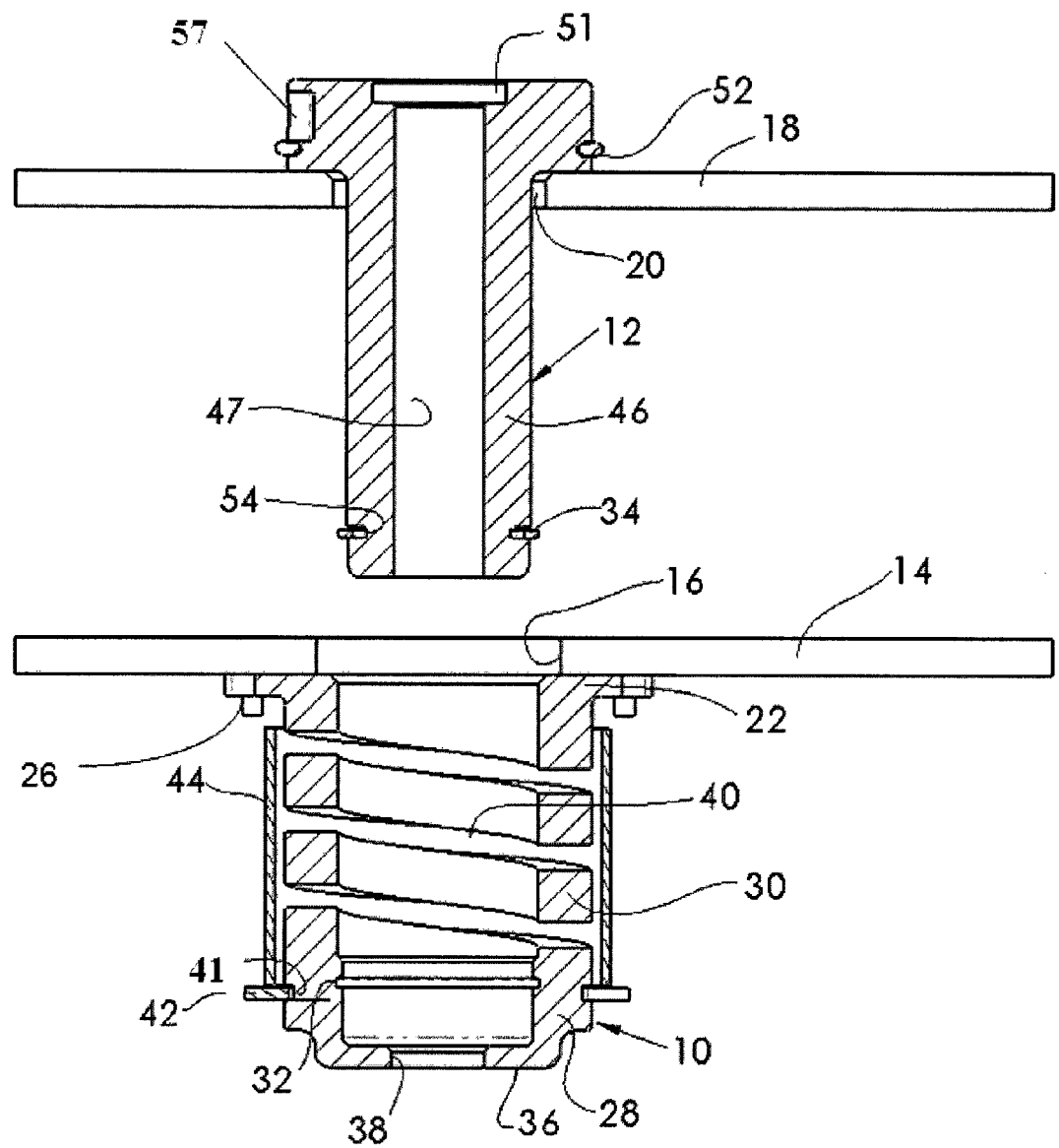
FIG. 1 is a cross-section view of the fastener assembly showing the fastener retainer secured on the bottom side of a first work piece and a fastener bolt aligned on the top side of a second work piece to be secured together by the fastener.
Figure 2:
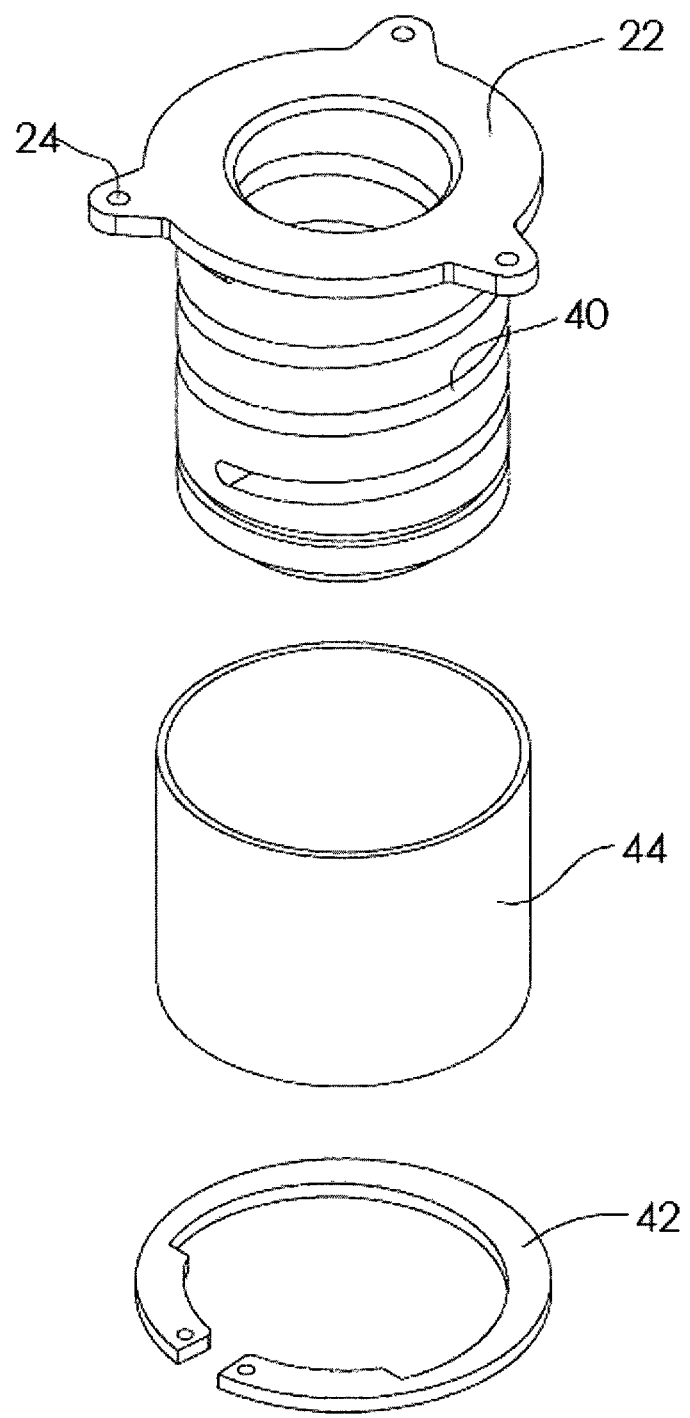
FIG. 2 is an exploded, perspective view of the three parts of the fastener receptacle.
Figure 3:
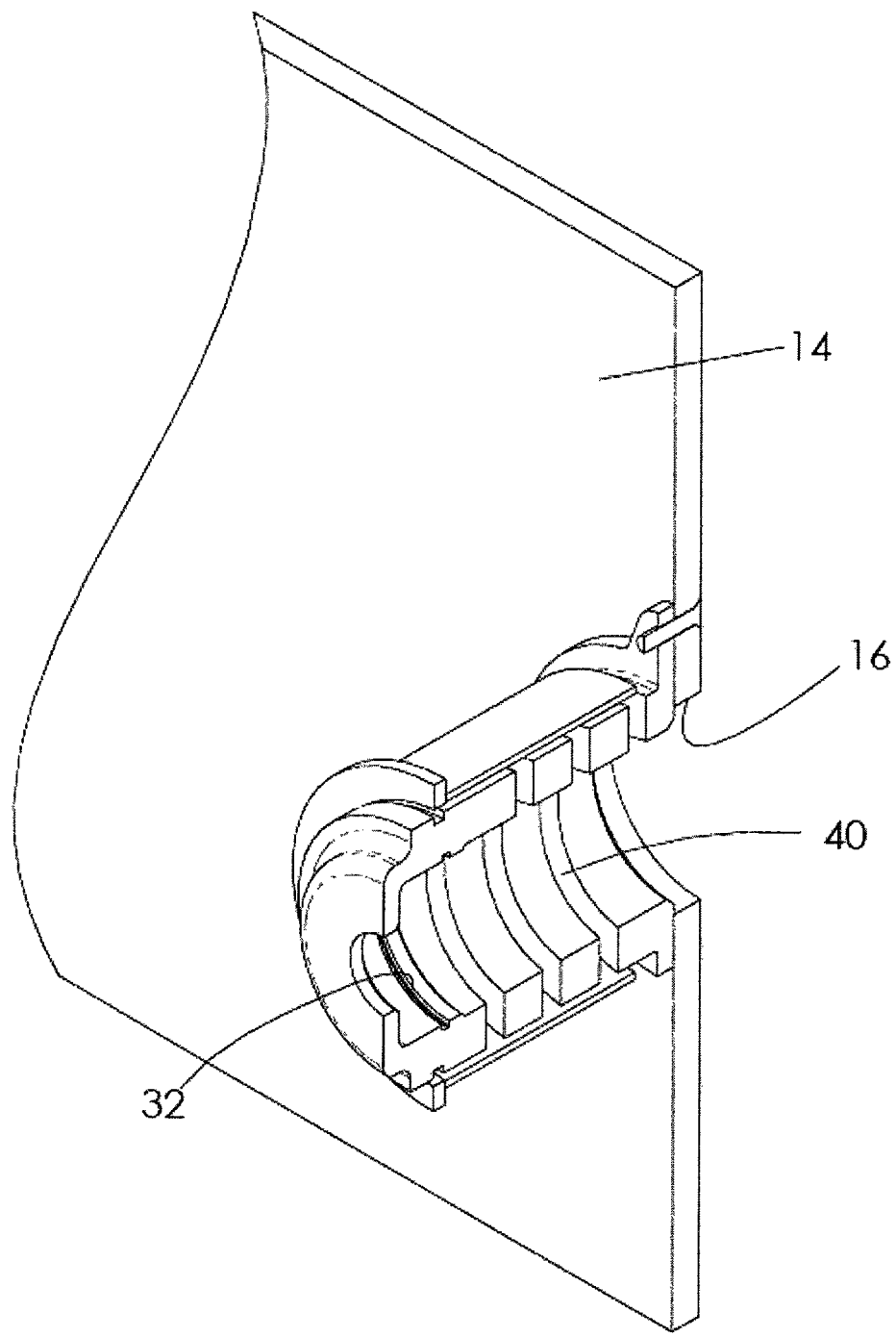
FIG. 3 is a cross-section view of the fastener receptacle and work piece.

Referring to FIGS. 1 to 3, the quick lock fastener of this invention includes a receptacle 10 and a bolt 12. The receptacle 10 is adapted to be irremovably attached to a first work piece 14, such as a plate, housing or the like, having a generally planar upper and lower surface. The first work piece 14 includes a generally circular aperture 16 to receive the bolt 12. The fastener is associated with and is attached to a second work piece 18, such as a plate, housing or the like, also having generally upper and lower planar surfaces. The orientations used above, as well as below, of "upper" and "lower" is for convenience of description; any orientation can be substituted, e.g. right and left, or any angle. The second work piece also includes a generally circular aperture 20 to receive the bolt 12. The bolt 12 is adapted to be releasably secured to the receptacle 10 to thereby releasably attach the second work piece 18 in locked engagement to the first work piece 14.

The work pieces may be formed from metallic and/or non-metallic materials including by way of example, but not limitation, steel, stainless steel, all steel alloys, aluminum, all aluminum alloys, titanium, all titanium alloys, plastic, and composite materials including graphite, carbon, quartz, glass, polymers, and cellulose.

The receptacle 10 includes a generally plate like base member 22. The base member 22 includes generally planar upper and lower surfaces and includes one or more apertures 24 for use in attaching the base member 22 to a surface of the first work piece 14 with fasteners 26, such as threaded fasteners, rivets, and the like.

FIG. 1 shows the receptacle 10 has a housing 28 that extends from the base member 22 and includes a generally cylindrical side wall 30. The housing 28 includes an annular groove 32 formed in the interior of the side wall 30 generally parallel to the base member 22 to receive a biasing member, such as a bolt retaining ring 34. The term "biasing member is meant to include any of a wide variety of biasing devices such as a retaining ring, snap ring or circlip, which are fasteners that lock a component in a receptacle when installed in a groove in the receptacle. The housing terminates in a generally planar and circular end wall 36 formed with an aperture 38 to receive the end of a tool, described below. The housing side wall 30 has helical apertures 40 formed in the side wall to form a machined integral spring of high strength. The receptacle 10 has an annular groove 41 formed in the exterior of the side wall 30 generally parallel to the base member 22 to receive a biasing member, such as an exterior retaining ring 42. A co-axial sleeve 44 is located on the housing 28 between the exterior retaining ring 42 and the base member 22 to limit the spring compression travel.

Figure 4:
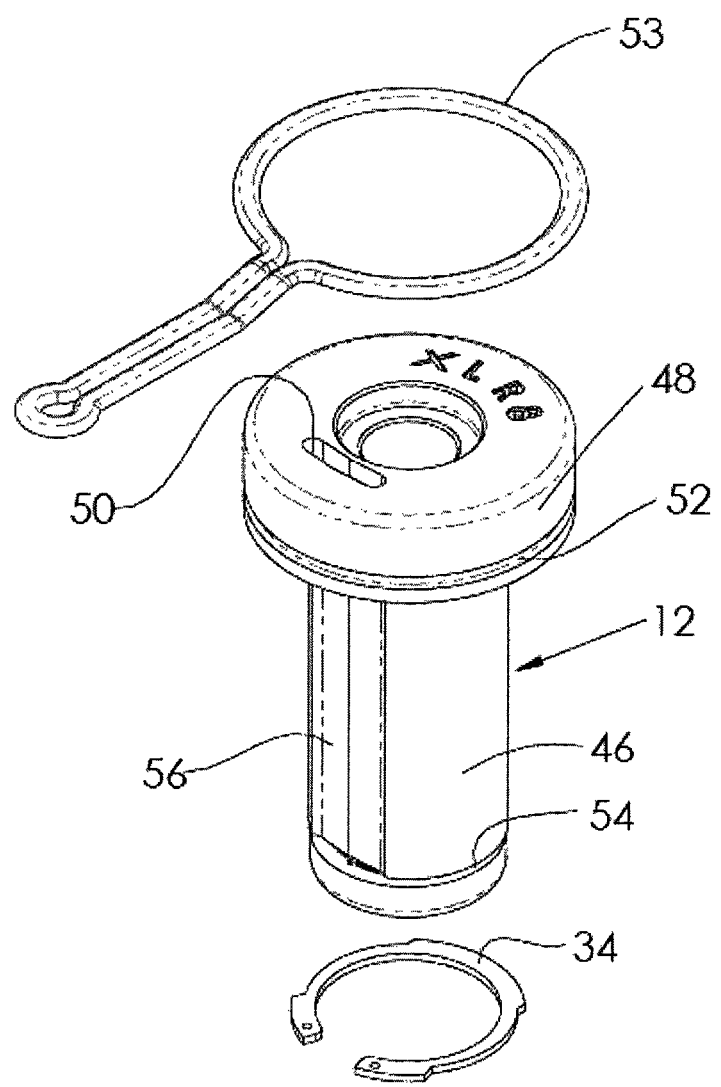
FIG. 4 is a perspective view of the fastener bolt components including a retaining ring for locking the bolt to the receptacle and a wire ring captive lanyard.
Figure 5:
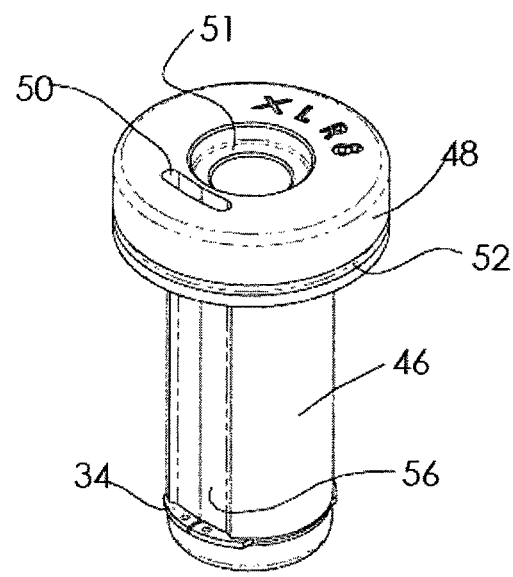
FIG. 5 is a perspective view of the assembled fastener bolt, showing a cut off section.

Referring additionally to FIGS. 4 and 5, the fastener includes the bolt 12 having a tubular and cylindrical body 46 with a central longitudinal axial opening 47 as shown in FIG. 1 and a bolt head 48 at one end that is larger in diameter than the body 46. The top surface of the bolt head 48 includes a counter bore 51 to the axial opening 47. The side surface of the bolt head includes a receiving recess 52 for a lanyard 53. A region of the bolt body 46 distal to the head 48 has an annular exterior groove 54 for receiving the bolt retaining ring 34 or other biasing member referred to above. The slot 50 in the top surface of the bolt head 48 extends to a cut-away section 56 of the bolt body 46 to enable a tool to access to the retaining ring 34 on the bolt body when the bolt is inserted into the receptacle 10 to thereby enable the retaining ring 34 to be locked into the internal receptacle groove 32, as will be described further below.

Figure 6:
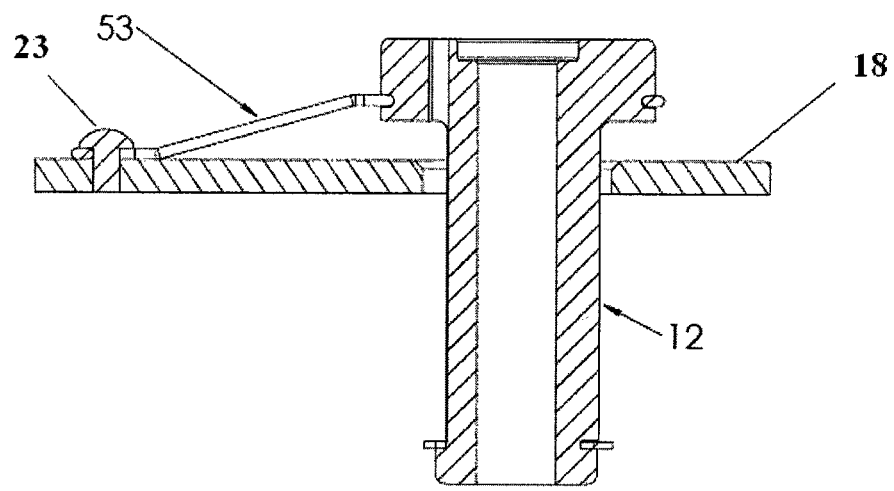
FIG. 6 shows the fastener lifted by a spring lanyard when not engaged.
Figure 7:
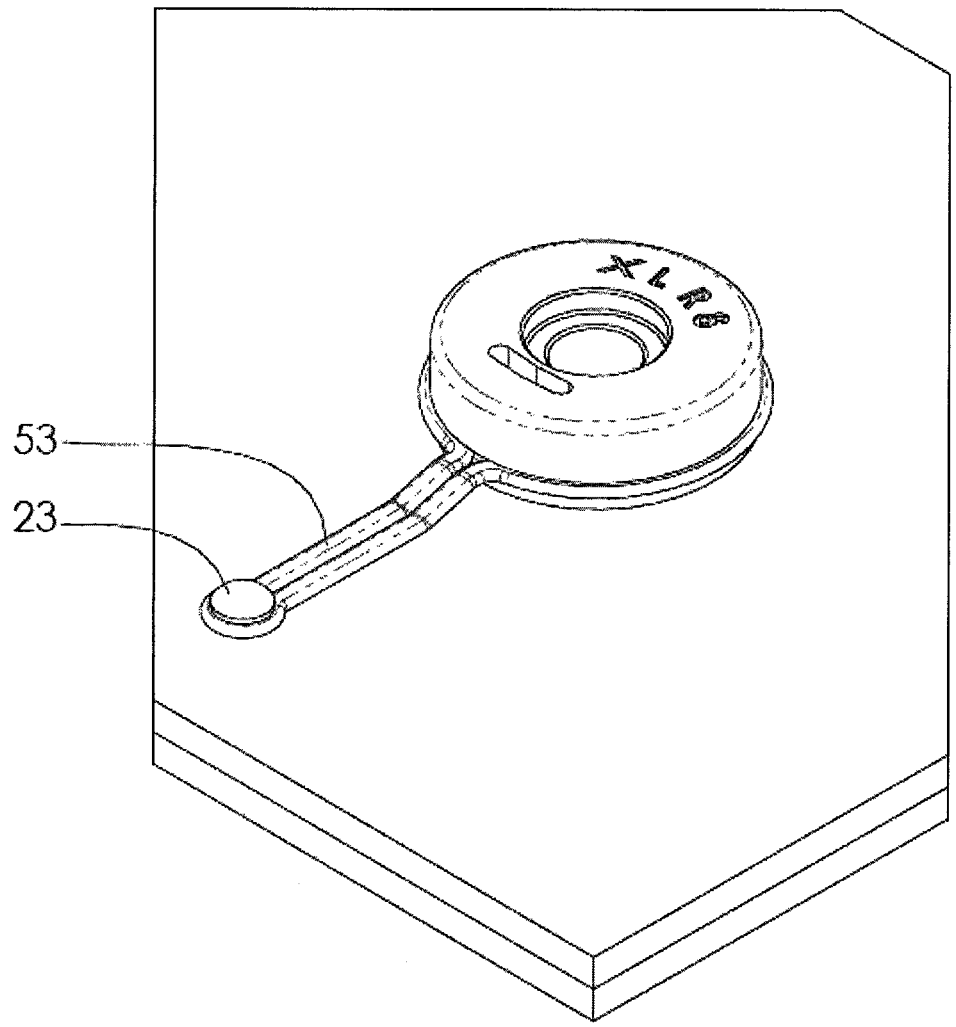
FIG. 7 is a perspective view of the fastener assembly, and wire captive lanyard, secured across first and second work pieces.

Referring additionally to FIGS. 6 and 7, the lanyard 53 is used in the receiving recess 52 to retain the fastener bolt 12 to the second work piece 18 for ease of assembly. The other end of the lanyard 53 is attached to the second work piece 18 with a fastener 23, such as a threaded screw, rivet, or the like. The lanyard 53 is made of resilient material (i.e., spring steel) which lifts the fastener 12 axially a distance from the surface of the second work piece 18 when disengaged from the receptacle 10. The raised position of the bolt indicates that the bolt is not fastened.

Figure 8:
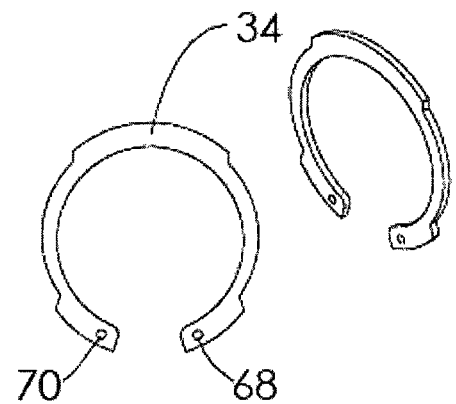
FIG. 8 shows plan and perspective views of a bolt retaining ring used in the invention, in a relaxed state with no load applied while seated on the bolt body prior to assembly of the fastener.
Figure 9:
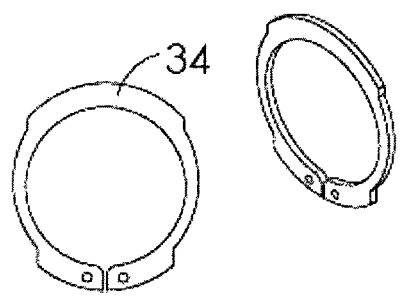
FIG. 9 shows plan and perspective views of the retaining ring fully compressed while seated on the bolt body to create a clearance fit between the receptacle groove and the outside surface of the retaining ring during fastener assembly.
Figure 10:
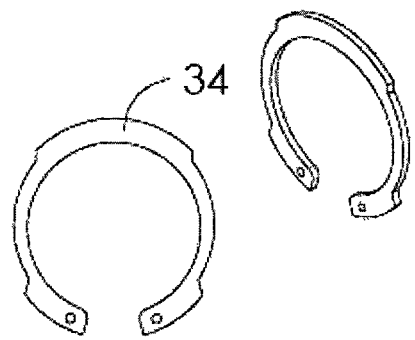
FIG. 10 shows plan and perspective views of the retaining ring partially compressed by contact between the outer surface of the ring and the inner surface of the receptacle groove at final fastener assembly.
Figure 11:
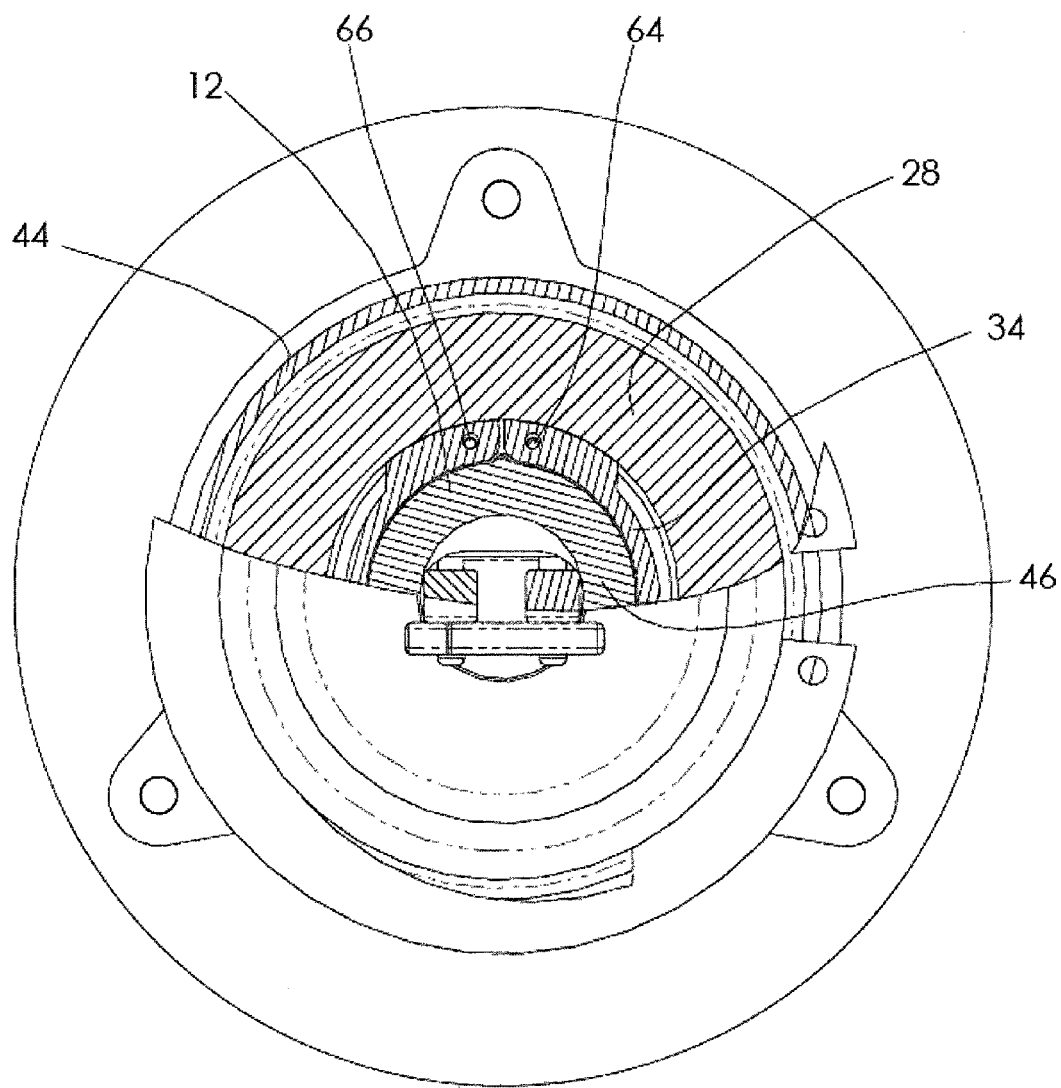
FIG. 11 is a plan, partially cut-away view of the fastener with the retaining ring fully compressed, as in FIG. 9, while seated on the bolt body to create a clearance fit between the receptacle groove and the outer surface of the retaining ring during fastener assembly.
Figure 12:
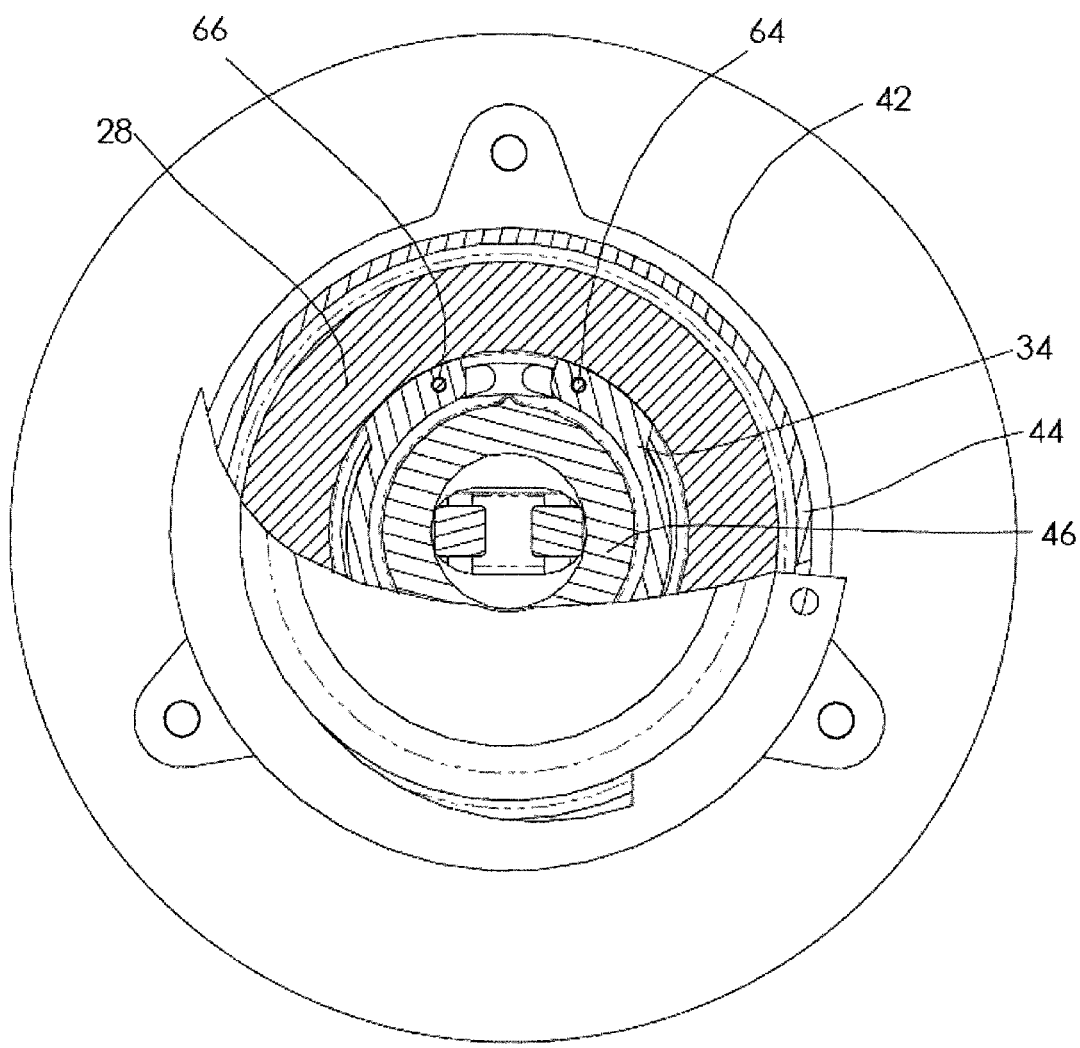
FIG. 12 is a plan, partially cut-away view of the fastener with the retaining ring partially compressed, as in FIG. 10, by contact between the outer surface of the ring and the inner surface of the receptacle groove at final fastener assembly.

Referring to FIGS. 8-12 in conjunction with FIGS. 3-5, details concerning use of the bolt retaining ring 34 are shown. FIG. 8 shows the retaining ring 34 in a relaxed state with no load applied while seated on the bolt body 46 prior to assembly of the fastener. FIGS. 9 and 11 show the retaining ring 34 fully compressed while seated on the bolt body 46 to create a clearance fit between the receptacle groove 32 and the outside surface of the retaining ring during fastener assembly. FIGS. 10 and 12 show the retaining ring 34 partially compressed by contact between the outer surface of the retaining ring 34 and the inner surface of the receptacle groove 32 at final fastener assembly.

Figure 13:
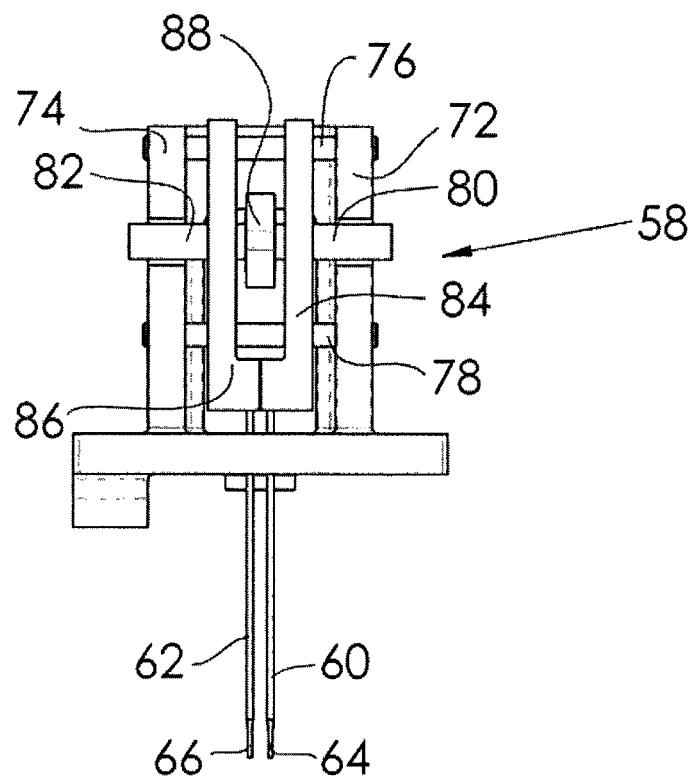
FIG. 13 is an elevation view of the retaining ring lever component of a tool used to load and lock the fastener bolt to the fastener receptacle.
Figure 14:
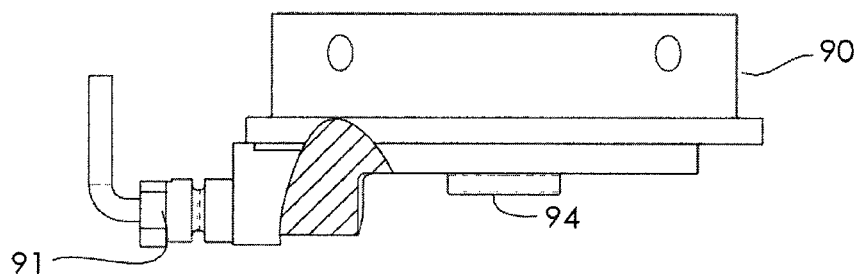
FIG. 14 is an elevation, partially cross-section, view of the base component of the tool.
Figure 15:
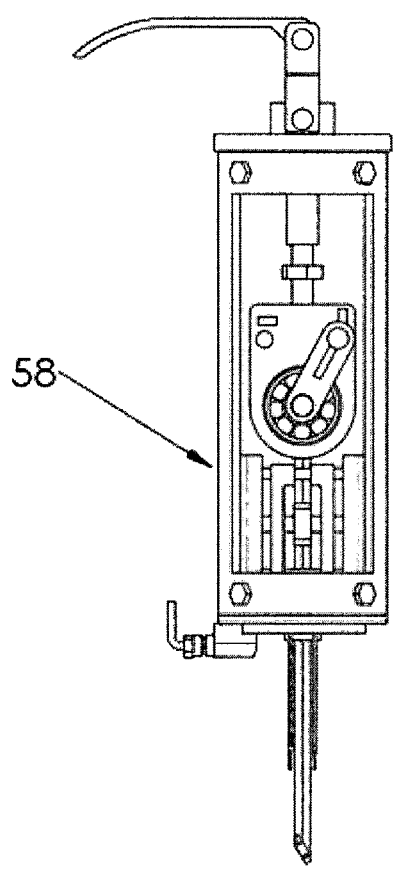
FIG. 15 is a plan view of the tool at its initial lever setup.

Referring additionally to FIGS. 13-15, details are shown of a jaw positioning tool 58, shown schematically in FIG. 13, used to compress the ends of the bolt retaining ring 34 so as to secure the bolt 12 into the receptacle 10. Referring specifically to FIG. 13, the tool 58 has a pair of jaws 60 and 62 with pin tips 64 and 66 (FIGS. 11 and 12) that can engage respective receiving holes 68 and 70 in the free ends of the retaining ring 34 (see FIGS. 8-12) and can be drawn inward to compress the retaining ring 34 with the minimum outside diameter to enable the bolt 12 to be inserted into the receptacle 10 and then to spread apart the retaining ring 34 so that it locks into the internal receptacle groove 32 (see FIG. 1). The jaw positioning tool 58 comprises a jack screw formed with a pair of opposing support columns 72 and 74 for opposing guide pins 76 and 78, a left hand threaded shaft 80 and a right hand threaded shaft 82 positioned through a pair of opposing support members 84 and 86 that support the respective jaws 60 and 62. A centered jaw spread lever 88 rotates the shafts 80 and 82 and moves the support members 84 and 86, hence moves the jaws 60 and 62 and tips 64 and 66, apart and together.

FIG. 14 shows details of a base component 90 and its plunger 91 of the tool 58. The retractable plunger engages a counter bore 57 in the side of the bolt head as shown FIG. 1. The tool base 90 boss surface 94 shown in FIG. 14 mates with the counter bore 51 (FIGS. 1 and 5) on the top of the bolt head.

Figure 16:
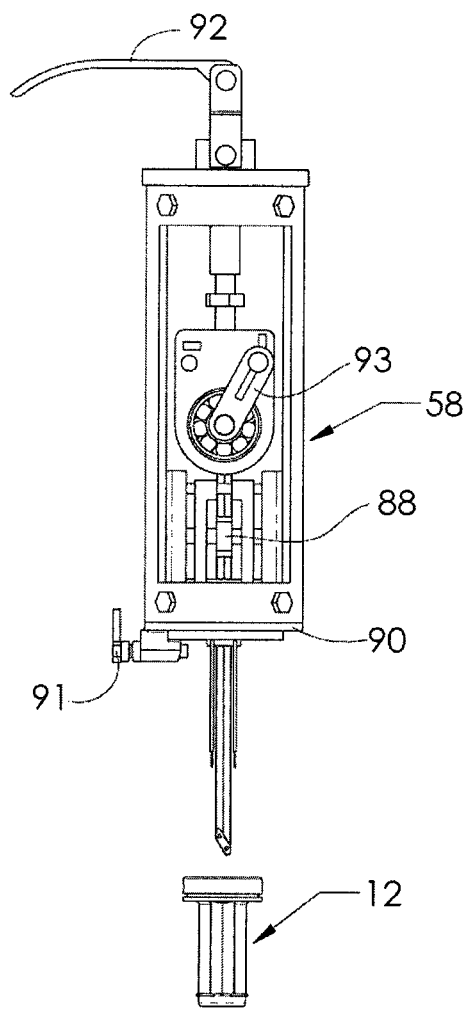
FIG. 16 is a plan view of the tool and fastener bolt positioned for insertion of the tool into the fastener bolt.
Figure 17:
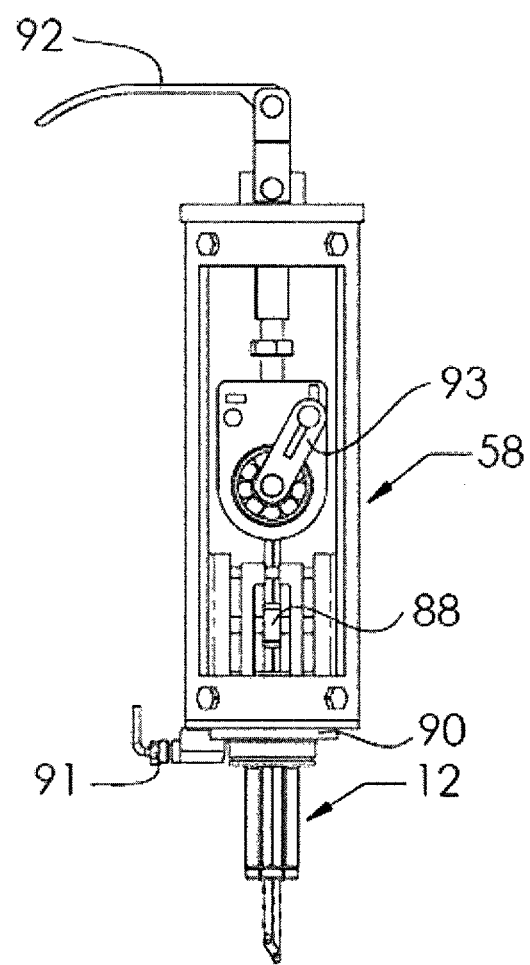
FIG. 17 is a plan view of the tool fully inserted into the fastener bolt.
Figure 18:
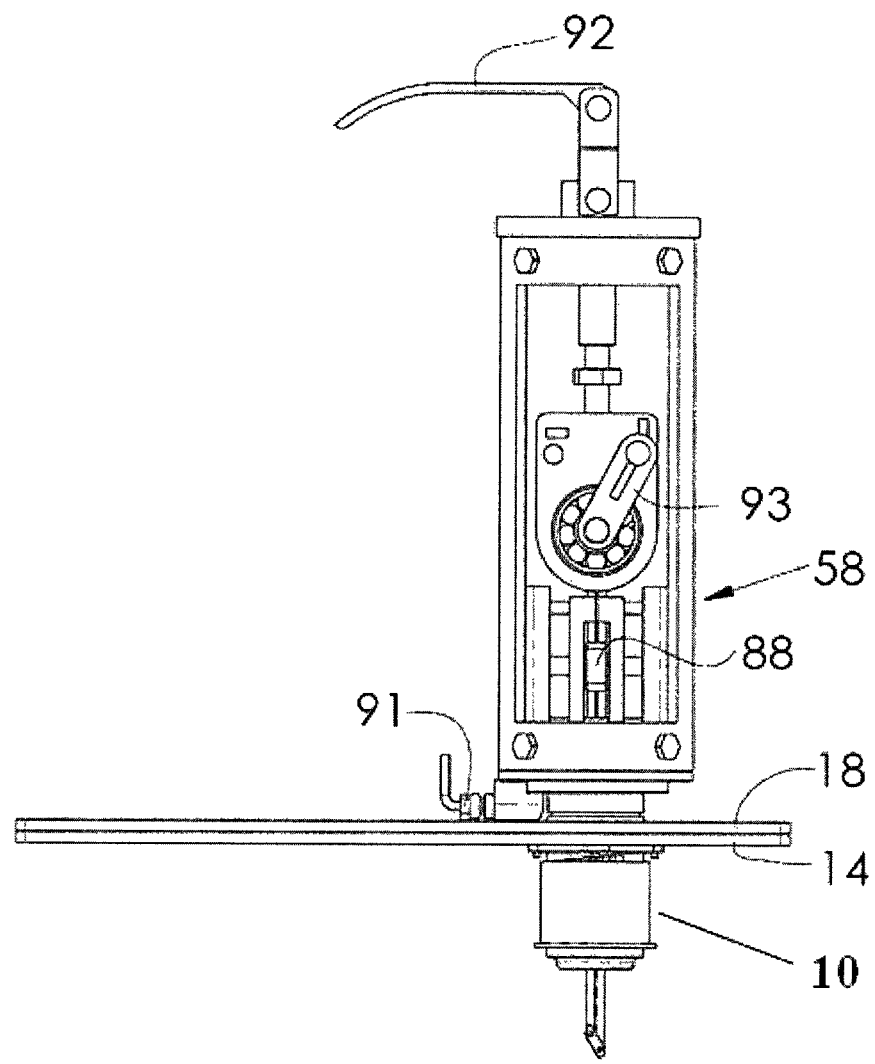
FIG. 18 is a plan view of the tool fully inserted into the fastener, secured across first and second work pieces.
Figure 19:
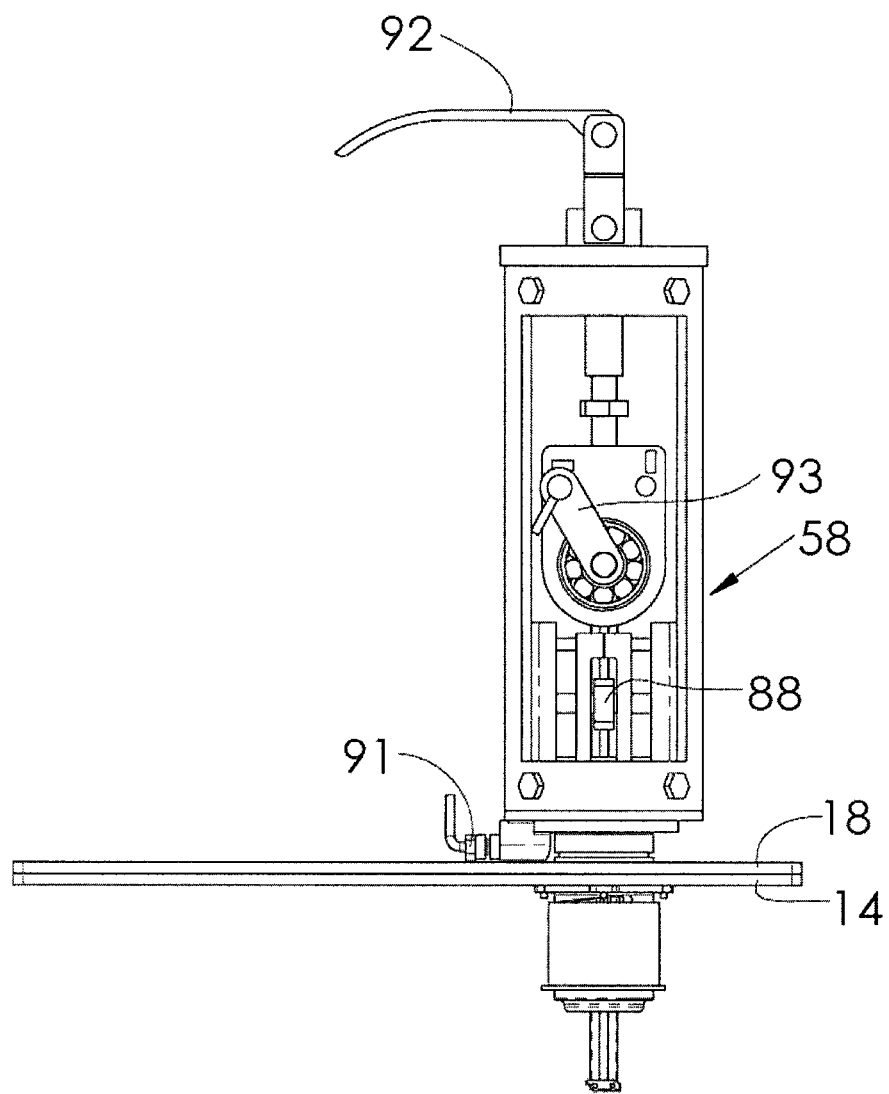
FIG. 19 is a plan view of the fully inserted tool as in FIG. 18 but with the clamp end rotated from vertically directed to horizontally directed.
Figure 20:
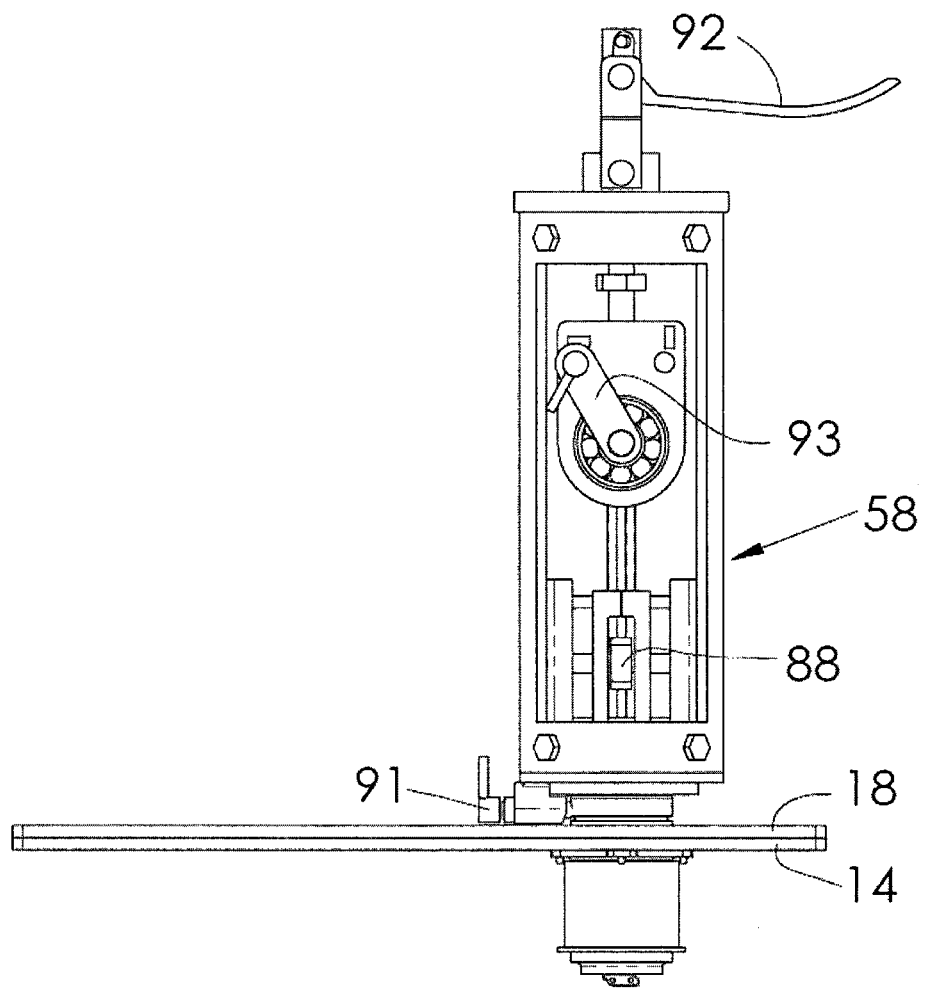
FIG. 20 is a plan view of the fully inserted tool as in FIG. 19 but with the retaining ring compressed and the clamp lever rotated to load the fastener.
Figure 21:
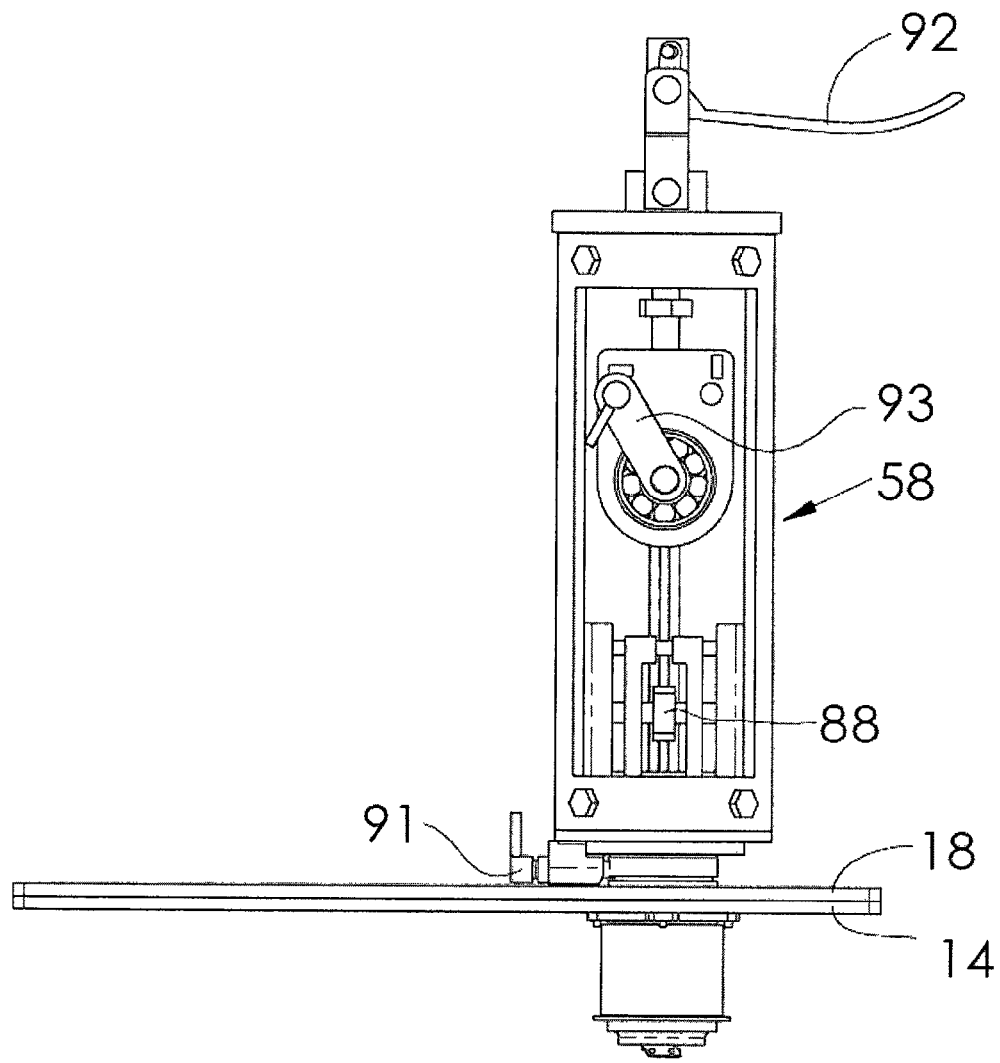
FIG. 21 is a plan view of the fully inserted tool as in FIG. 20 but with the retaining ring slightly compressed and released into the receptacle groove.
Figure 22:
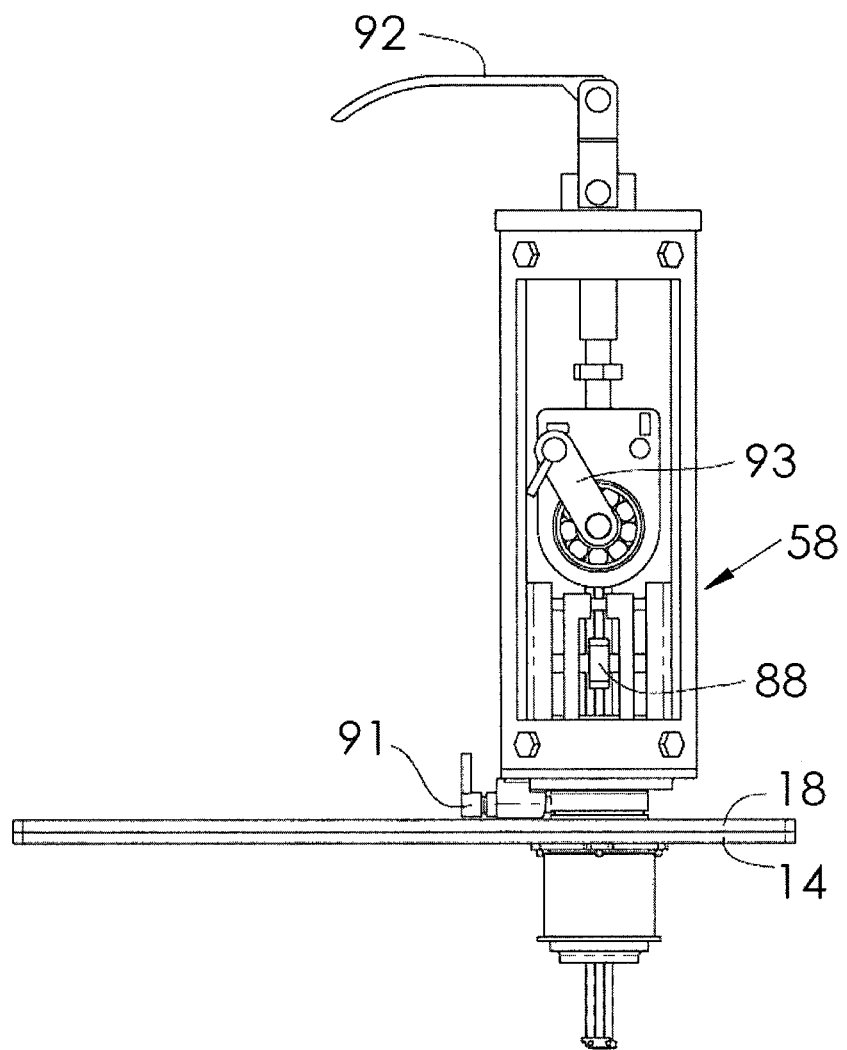
FIG. 22 is a plan view of the fully inserted tool as in FIG. 21 but with the clamp lever rotated to unload the fastener.
Figure 23:
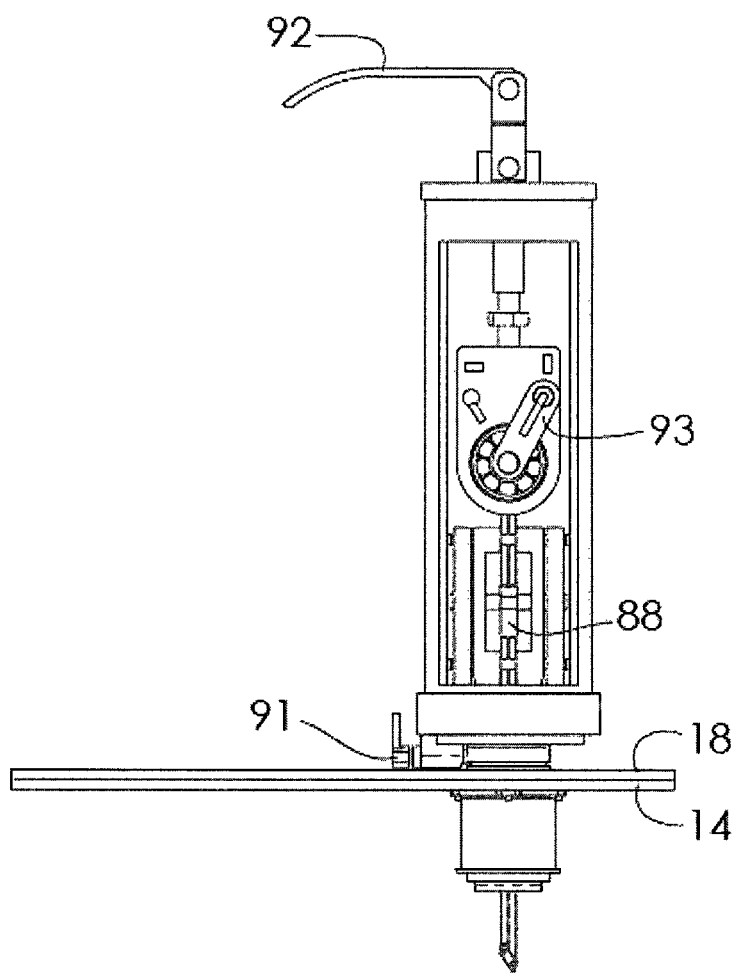
FIG. 23 is a plan view of the fully inserted tool as in FIG. 22 but with the clamp end rotated to from horizontally directed to vertically directed and the plunger retracted, to enable the tool to be removed from the fastener.

Referring additionally to FIGS. 15-23, more details of the jaw positioning tool 58 in relation to the bolt and receptacle are shown. The jaw positioning tool 58 is used to load and lock the fastener bolt 12 to the fastener receptacle 10. FIG. 15 shows the tool 58 at its initial lever setup. In FIGS. 16-23, the tool 58 has seven lever setups which occur sequentially to fasten the assembly. The first setup is to place the lever positions into the initial position on the tool as shown in FIG. 16. The retractable plunger 91 in the base 90 is retracted, the jaw spread lever 88 is set for an uncompressed retainer ring, the clamp end 93 is vertically directed, and the clamp 92 is extended. In another step, shown in FIG. 17, the tool 58 is attached to the fastener 12 by means of mating the counter bore surface located on the fastener top with the tool base 90, then the retractable plunger 92 extends to insert into the counter bore located on the side of the bolt head. Referring back to FIG. 13, the tool pins 64 and 66 are inserted into the fastener retaining ring lug end holes as shown in FIG. 8. In a next step, as shown in FIG. 18, the tool 58 with fastener 12 attached is inserted through work pieces 14 and 18 and receptacle 10. The jaw spread lever 88 is rotated to move the pins inward to the position as shown in FIG. 9 to compress the retaining ring 34. In the next step, the clamp end lever 93 is rotated so that the clamp end is horizontally directed as shown in FIG. 19. Next, the clamp lever 92 moves to retract the clamp end as shown in FIG. 20. Then, as shown in FIG. 21, the jaw spread lever 88 moves to expand the retaining ring 34 as shown in FIG. 10 and release it into the receptacle groove and secure bolt to the receptacle. To remove the tool 58, as shown on FIG. 2, the clamp lever 92 moves to extend the clamp end and release the external clamp load on the receptacle, then the clamp angle lever rotates to align the clamp end axially as shown in FIG. 23, the retractable plunger 91 retracting to release the fastener.

Recapping, FIG. 16 shows the tool 58 and fastener bolt 12 positioned for insertion of the tool 58 into the fastener bolt 12 with the clamp lever 92 extended, the position of the clamp end lever 93 at a vertically directed angle, the jaw spread lever 88 position aligns for free state retaining ring 34, and the plunger 91 of the base 90 retracts to allow clearance to attach fastener 12. FIG. 17 shows the tool 58 fully inserted into the fastener bolt 12 with the jaw spread lever 88 uncompressing the bolt retaining ring 34 as shown in FIG. 8 to engage the pin ends 66 and 64. The plunger 91 of the base 90 extends to engage the counter bore on the side of the bolt head and secure the fastener 12 to the tool 58. FIG. 18 shows the tool 58 fully inserted into the fastener, secured across first and second work pieces 14 and 18 with the clamp end rotating lever 93 at a vertically directed angle, the jaw spread lever 88 compressing the bolt retaining ring 34 as shown in FIG. 9 for retaining ring clearance inside the receptacle 10. FIG. 19 also shows the tool 58 fully inserted into the fastener, secured across first and second work pieces 14 and 18 with the jaw rotating lever 93 at a horizontally directed angle and locked in place by the extended plunger 92 for safety. FIG. 20 shows the fully inserted tool as in FIG. 19 but with the clamp lever 92 rotated to compress the receptacle 10 and work pieces 14 and 18 against the fastener 12. FIG. 21 shows the fully inserted tool as in FIG. 20 but with jaw spread lever 88 in a position that lowers the compression and releases the retaining ring 34 as shown in FIG. 10 into the adjacent receptacle groove for final assembly. FIG. 22 shows the fully inserted tool as in FIG. 21 but with the clamp lever 92 extended to unload the fastener. FIG. 23 shows the fully inserted tool as in FIG. 22 but with the position of the clamp end lever 93 rotated to from horizontally directed to vertically directed and the plunger 91 of the base 90 retracted to enable the tool 58 to be removed from the fastener.

Figure 24:
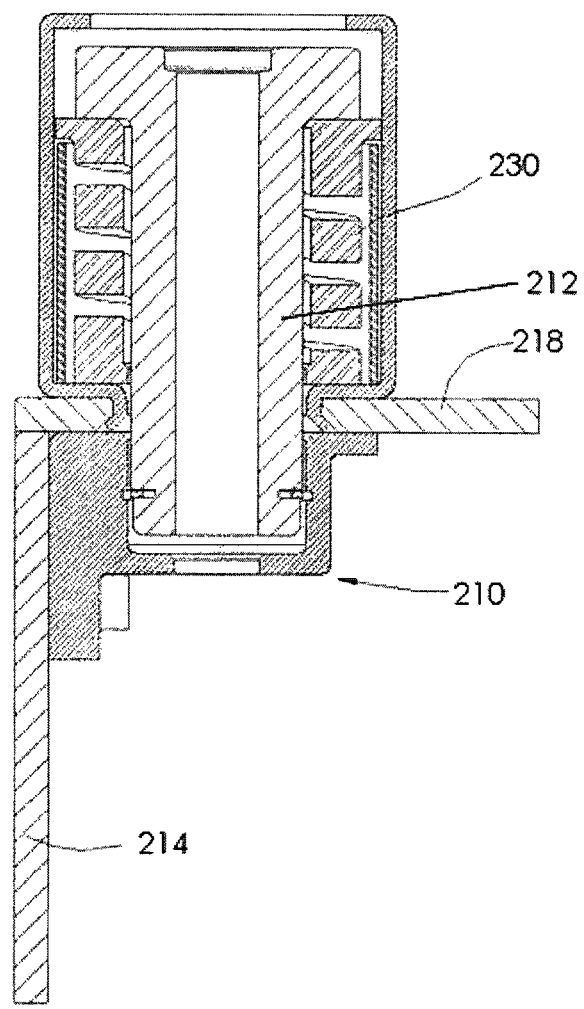
FIG. 24 is a cross-section view of a second embodiment of the fastener assembly showing the fastener retainer secured to an adjacent side panel on the bottom side of a first work piece and both the spring and a fastener bolt aligned on the top side of a second work piece secured together by the fastener.

Referring to FIG. 24, a second embodiment of the invention is shown where many of the individual components are the same as FIG. 1, but where the fastener receptacle 210 is secured to an adjacent side panel on the interior side of the first work piece 214 and both the spring 230 and fastener bolt 212 are aligned on the top side of the second work piece 218 secured together by the fastener.

Figure 25:
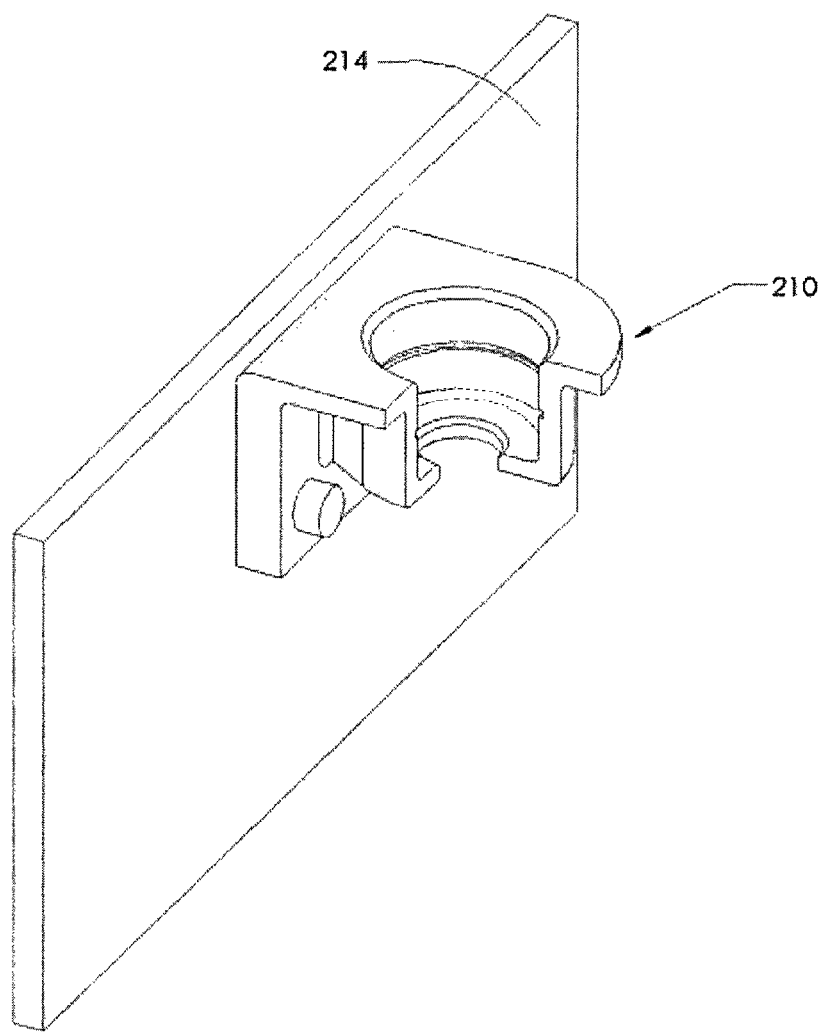
FIG. 25 is a cross section view of the second embodiment of the fastener assembly showing the fastener receptacle and the work piece.

FIG. 25 shows the second embodiment of the receptacle 210 adapted to be irremovably attached to a first work piece 214 as in FIG. 3, but the first work piece 214 in the second embodiment is oriented perpendicular to the second work piece.

Figure 26:
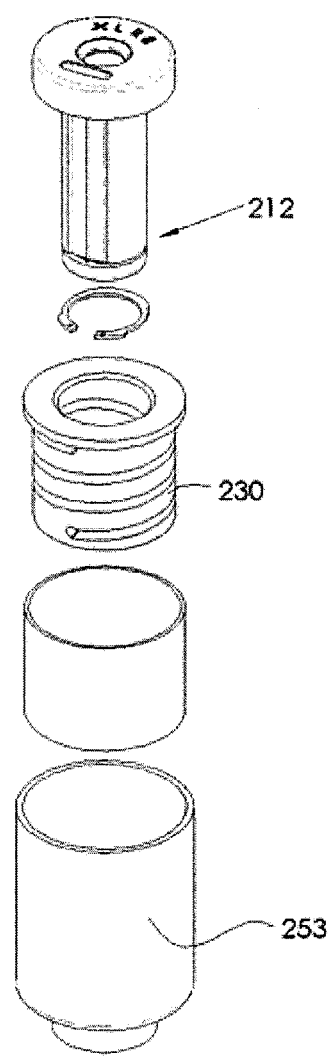
FIG. 26 is an exploded, perspective view of the five parts of the fastener bolt of the second embodiment.

FIG. 26 shows a second embodiment of the invention where individual parts are shown as part of the bolt assembly instead of as part of the receptacle assembly in FIG. 2. A formable cup 253 holds the individual pieces of the bolt assembly.

Figure 27:
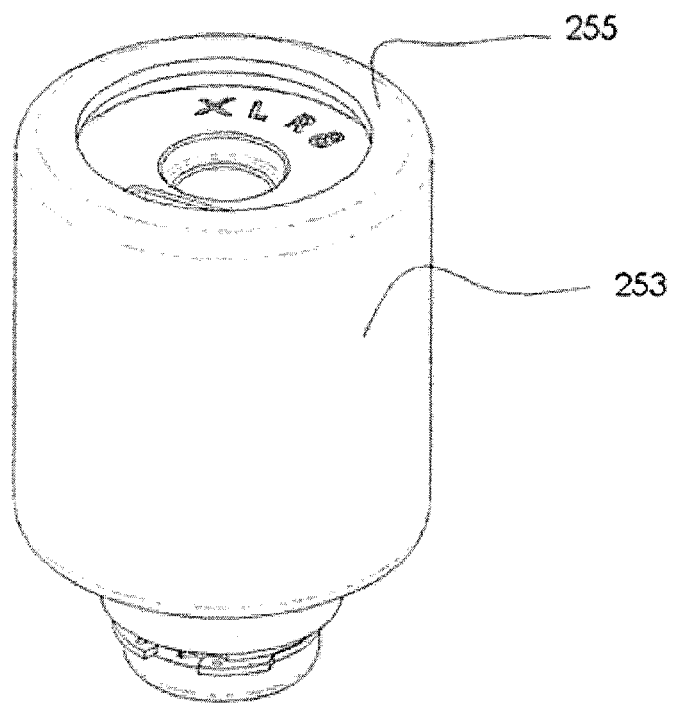
FIG. 27 is a perspective view of the assembled fastener bolt, showing a formed over flap at the top of the housing and contain the other parts of the assembly.

FIG. 27 shows the second embodiment of the invention where the top end of the cylindrical wall of the cup 253 is formed over to create a flange 255 which covers the fastener bolt The bottom end of the cylindrical wall of the cup 253 is formed over and irremovably attaches to the second work piece 218 similar to the purpose of the lanyard 53 in FIG. 6.

Figure 28:
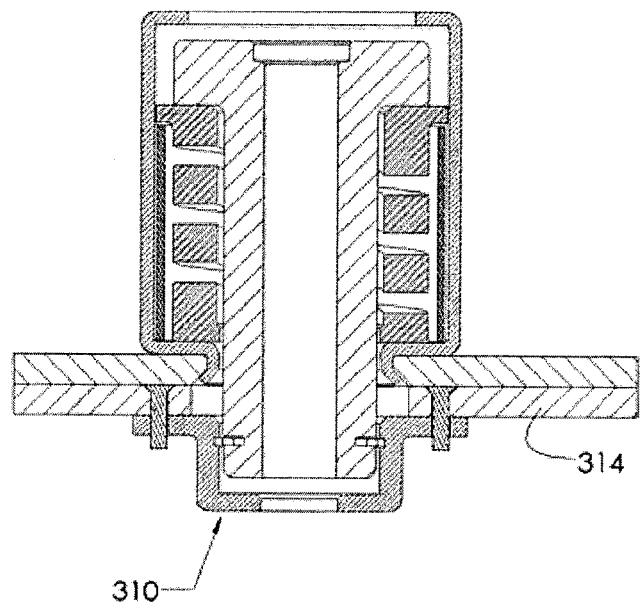
FIG. 28 is a cross-section view of a third embodiment of the fastener assembly showing the fastener retainer secured to the bottom side of a first work piece and both the spring and a fastener bolt aligned on the top side of a second work piece secured together by the fastener.

FIG. 28 shows a third embodiment of the invention where many of the parts are similar to FIG. 24, but where the receptacle 310 is secured to the bottom of the first work piece 314 in a manner similar to FIG. 1.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

The invention claimed is:

1. A fastener comprising:
   a bolt;
   a constraining member for the bolt;
   a receptacle for the bolt having an upper part and lower part, the upper part forming a spring integral in one piece with the lower part, the upper part configured for mounting, the movement of the lower part relative to the upper part being constrained by the constraining member, the bolt being formed to be inserted into the spring and upon compression of the spring to engage and interlock with the lower part of the receptacle.

2. The fastener of claim 1 wherein the fastener is adapted to employ the axially constrained spring to securely hold together first and second workpieces, each of which have apertures for the bolt.

3. The fastener of claim 2 wherein the bolt is adapted to be inserted through the first and second workpieces, the mounting configuration of the lower part of the receptacle being for mounting on a side of the second workpiece positioned concentrically located with the second workpiece aperture, the bolt having a shank end that exits the aperture of the second workpiece.

4. The fastener of claim 2 the mounting configuration of the lower part of the receptacle being for mounting on a side of the second workpiece, the bolt having a shank, the axis of the bolt shank is concentric with the axially constrained spring, the bolt shank extending through the aperture of the first workpiece and the aperture of the second workpiece.

5. The fastener of claim 1 wherein the lower part of the receptacle has an internal groove formed to receive a retaining ring and including a retaining ring carried on the bolt and positioned to engage the receptacle groove when the bolt is fully inserted into the receptacle whereby the fastener is self-locking through expansion of the retaining ring into the receptacle groove.

6. The fastener of claim 1 adapted for fastening first and second workpieces and in which the constraining member is a sleeve coaxial around the spring adapted to provide said constraint and to provide spring travel limit between the workpieces for protection from compression loads where the workpieces are separated due to an external force that otherwise would further compress the spring and wherein once the spring is compressed to a safe compression limit, the compression load is carried through the sleeve.

7. The fastener of claim 2 adapted for securing an assembly of the first and second workpieces face to face in contact wherein the bolt is positioned on one side of the assembly and the receptacle is positioned on the opposite side of the assembly.

* * * * *